(No Model.)
J. BERNADAC.
HORSESHOER'S KNIFE.
No. 343,426. Patented June 8, 1886.
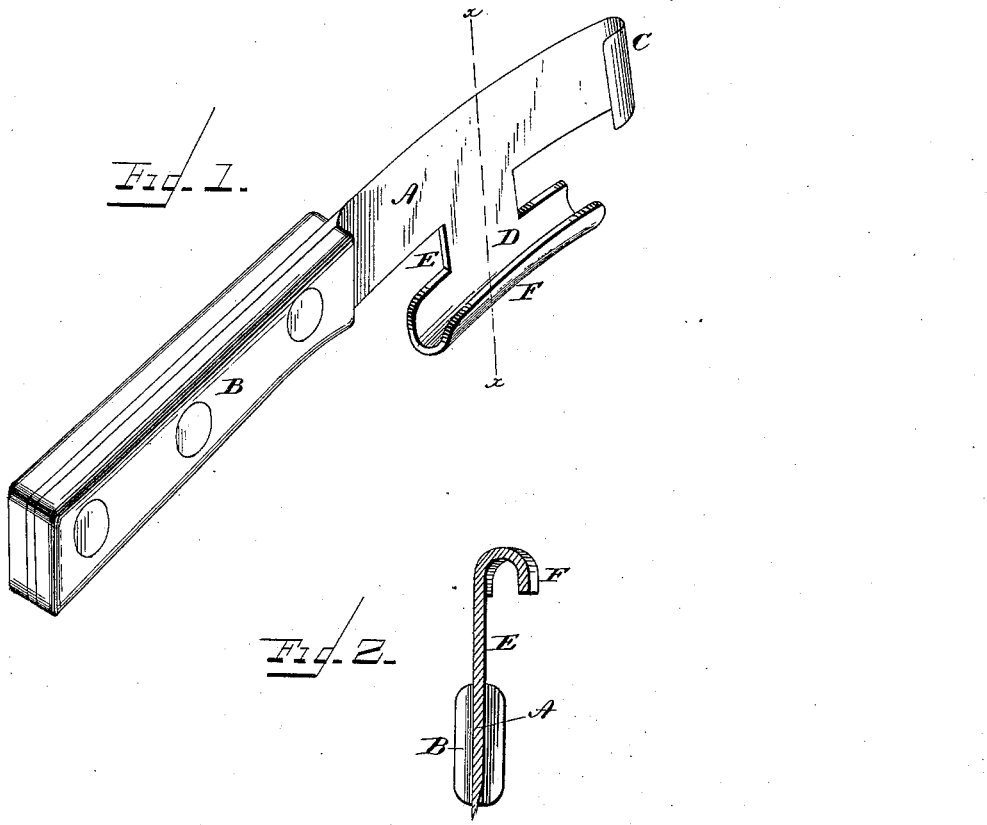
WITNESSES
F. L. Ourand
Edward Stanton
Jean Bernadac
INVENTOR
By Louis Bagger & Co
Attorneys.

UNITED STATES PATENT OFFICE.

JEAN BERNADAC, OF NEW IBERIA, LOUISIANA.

HORSESHOER'S KNIFE.

SPECIFICATION forming part of Letters Patent No. 343,426, dated June 8, 1886.

Application filed November 19, 1885. Serial No. 183,301. (No model.)

*To all whom it may concern:*

Be it known that I, JEAN BERNADAC, a citizen of the United States, and a resident of New Iberia, in the county of Iberia and State of Louisiana, have invented certain new and useful Improvements in Horseshoers' Paring-Knives; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved paring-knife, showing the hands of the operator in dotted lines; and Fig. 2 is a cross-sectional view of the same.

Similar letters of reference indicate corresponding parts in both the figures.

My invention has relation to horseshoers' paring-knives; and it consists in the improved construction and combination of parts of a paring-knife having means for grasping it conveniently to exercise the best possible power upon the same, as hereinafter more fully described and claimed.

In the accompanying drawings, the letter A indicates the blade of my paring-knife, which blade is provided with the usual handle, B, and which has the usual slight sidewise curve, rendering it convenient for cutting upon the slightly concave sole of a hoof. The outer end of the blade is formed with the usual bent portion, C, for paring in the corners formed between the sole and the side walls of the hoof, and between the sole and the frog of the hoof, as well as for causing the knife to cut the portions or slices of horn removed from the sole off perfectly clear and free without hanging onto the remaining portions of the sole. This part of the knife is entirely similar to the blade of the paring-knives usually made, and I make no claim of novelty for the same.

From the back of the knife, at about the middle of the same, projects a T-shaped handle, D, preferably integral with the blade, and the said handle consists of the shank E, which projects from the blade, and the cross-piece F, which is preferably formed by bending the edge of the cross-plate upon the shank, so as to form a rounded half-tube, as plainly seen in cross-section in Fig. 2 of the drawings. This cross-piece forms a convenient handle for one hand, while the other hand grasps the handle, allowing considerable force to be exerted upon the blade of the knife, and admitting of the blade of the knife being guided by the hand bearing against the cross-handle, and it will at the same time readily be seen that the knife may at the same time be used with one hand only, the handle being in no manner in the way for cutting or scraping with the knife using only one hand. At the same time, when the knife is to be used for cutting heavy horn—as, for instance, in trimming off the projecting rim of the hoof—the hand bearing against the cross-handle will act as a fulcrum for the knife in drawing the knife by the handle around the rim of the hoof. The concavo-convex end of the cross-handle may also be used for cleaning off the sole of the hoof before paring the same, its shape allowing it to enter into corners of the sole, and enabling it to effectually scrape the sole clean of all accumulated dirt. It follows that knives not provided with this cross-handle may be provided with it by simply securing the shank of the handle to the back of the blade, and that, if desired, the cross-handle may be solid, instead of semi-tubular; but I prefer the form shown and described as the most convenient and useful form.

Having thus described my invention, I claim and desire to secure by Letters Patent of the United States—

1. In a paring-knife, the combination of the usually-shaped blade provided with the handle at its inner end and with the backwardly-curved point, with a cross-handle having its shank secured to the back of the blade at or near its middle, as and for the purpose shown and set forth.

2. In a paring-knife, the combination of the usually-shaped blade provided with the handle at its inner end and with the backwardly-curved point, with a cross-handle consisting of a shank secured to the back of the blade at or near its middle, and a cross-plate curved into a semi-tubular shape, as and for the purpose shown and set forth.

3. A horseshoers' paring-knife consisting of a usually-shaped curved blade having its outer end bent backward, a handle and a shank projecting from the back of the blade integral with the same, and having a cross-plate at its end bent to form a semi-tubular cross-handle, as and for the purpose shown and set forth.

In testimony that I claim the foregoing as my own I have hereunto affixed my signature in presence of two witnesses.

JEAN BERNADAC.

Witnesses:
 WM. R. BURKE,
 P. L. RENOUDET.